(12) United States Patent
Black et al.

(10) Patent No.: US 9,168,783 B2
(45) Date of Patent: Oct. 27, 2015

(54) PIVOT HANGER ASSEMBLY SECURED TO A TUBULAR SUPPORT LOCATION ASSOCIATED WITH A VERTICALLY ACTUATING VEHICLE LIFT

(71) Applicants: Charles Black, East Jordan, MI (US); Gary Wade McMullen, Lennon, MI (US)

(72) Inventors: Charles Black, East Jordan, MI (US); Gary Wade McMullen, Lennon, MI (US)

( * ) Notice: Subject to any disclaimer, the term of this patent is extended or adjusted under 35 U.S.C. 154(b) by 39 days.

(21) Appl. No.: 13/835,161

(22) Filed: Mar. 15, 2013

(65) Prior Publication Data
US 2013/0240696 A1 Sep. 19, 2013

Related U.S. Application Data

(60) Provisional application No. 61/611,814, filed on Mar. 16, 2012.

(51) Int. Cl.
| | |
|---|---|
| *B60B 29/00* | (2006.01) |
| *B60B 30/06* | (2006.01) |
| *B66F 7/28* | (2006.01) |
| *B66F 13/00* | (2006.01) |
| *F16M 13/02* | (2006.01) |

(52) U.S. Cl.
CPC ............... *B60B 29/00* (2013.01); *B60B 30/06* (2013.01); *B66F 7/28* (2013.01); *B66F 13/00* (2013.01); *F16M 13/022* (2013.01)

(58) Field of Classification Search
CPC ............ B66F 7/28; B60B 29/00; B60B 30/06
USPC ............................................. 248/215, 231.61
See application file for complete search history.

(56) References Cited

U.S. PATENT DOCUMENTS

| | | | | |
|---|---|---|---|---|
| 518,308 | A * | 4/1894 | Corscaden ...................... 16/381 |
| 722,349 | A * | 3/1903 | Young ............................ 248/211 |
| 765,152 | A * | 7/1904 | Stark ............................... 16/380 |
| 1,228,531 | A * | 6/1917 | Cavanaugh ................... 248/254 |
| 1,404,029 | A * | 1/1922 | Kapp ............................. 248/215 |
| 2,461,256 | A * | 2/1949 | Black ............................ 440/109 |
| 3,313,507 | A * | 4/1967 | Belli .............................. 248/211 |
| 3,337,880 | A * | 8/1967 | Florek ........................... 5/503.1 |
| 3,353,778 | A * | 11/1967 | Sylvain et al. ................ 248/211 |
| 3,588,019 | A * | 6/1971 | Cozeck ........................ 248/228.6 |
| 3,664,626 | A * | 5/1972 | Sneller ....................... 248/224.7 |
| 3,986,694 | A * | 10/1976 | Nowak .......................... 248/211 |
| 4,032,100 | A * | 6/1977 | Kahn ............................. 248/211 |
| 4,116,373 | A * | 9/1978 | Bryngelson ................. 224/42.21 |
| 4,140,294 | A * | 2/1979 | Zwarts .......................... 248/265 |
| 4,141,524 | A * | 2/1979 | Corvese, Jr. .................... 248/70 |
| 4,185,801 | A * | 1/1980 | Plymoth ..................... 248/282.1 |

(Continued)

*Primary Examiner* — J. Allen Shriver, II
*Assistant Examiner* — Chiedu Chibogu
(74) *Attorney, Agent, or Firm* — Dinsmore & Shohl LLP

(57) ABSTRACT

A pivot hanger assembly adapted to being mounted to a structural supporting location associated with a vehicle lift. A clamp subassembly includes a plurality of assembleable and inter-adjustable brackets adapted to being affixed around a rectangular tubular perimeter corresponding to the structural supporting location of the vehicle lift. A selected one of the brackets exhibits at least a first hinge collar support extending along a vertically extending edge, with an elongated arm exhibiting at least a second hinge collar support along a proximal end which aligns with the first collar support in order to define a continuous channel. A hinge pin inserts through the continuous channel and in order to hingedly mount the arm to the clamp subassembly in a load bearing permitting fashion.

5 Claims, 3 Drawing Sheets

(56) References Cited

U.S. PATENT DOCUMENTS

| | | | |
|---|---|---|---|
| 4,270,237 A * | 6/1981 | Breeze et al. | 470/49 |
| D261,709 S * | 11/1981 | Hartman | D8/373 |
| D291,175 S * | 8/1987 | Rogers | D8/327 |
| 4,727,890 A * | 3/1988 | Vincent | 131/329 |
| 4,821,988 A * | 4/1989 | Jimenez | 248/227.3 |
| 4,949,924 A * | 8/1990 | Carmody | 248/215 |
| 4,967,929 A * | 11/1990 | Turner | 221/70 |
| 5,173,993 A * | 12/1992 | Baker | 16/329 |
| 5,240,214 A * | 8/1993 | Birnbaum et al. | 248/231.41 |
| 5,368,267 A * | 11/1994 | Howard | 248/231.41 |
| 5,618,228 A * | 4/1997 | Anderson | 451/403 |
| 5,620,059 A * | 4/1997 | Crispeno | 182/127 |
| 5,657,884 A * | 8/1997 | Zilincar, III | 211/86.01 |
| 5,822,918 A * | 10/1998 | Helfman et al. | 47/39 |
| 5,873,433 A * | 2/1999 | Katz | 182/129 |
| 6,189,748 B1 | 2/2001 | Hutter et al. | |
| 6,257,537 B1 * | 7/2001 | Williams | 248/226.11 |
| 6,338,459 B1 * | 1/2002 | Biggs | 248/210 |
| 6,398,174 B1 * | 6/2002 | Emalfarb | 248/214 |
| 6,402,108 B1 * | 6/2002 | Remmers | 248/243 |
| 6,481,947 B2 * | 11/2002 | Ortega | 414/426 |
| 6,761,465 B2 * | 7/2004 | Little | 362/183 |
| 7,354,023 B1 * | 4/2008 | Wappler | 248/206.5 |
| D568,727 S * | 5/2008 | Walker et al. | D8/380 |
| 7,735,800 B2 * | 6/2010 | Lunato et al. | 248/558 |
| 7,815,158 B2 | 10/2010 | Henderson | |
| 8,245,991 B2 | 8/2012 | Hung | |
| 2002/0003196 A1 | 1/2002 | Gibson et al. | |
| 2002/0047077 A1 | 4/2002 | Gibson et al. | |
| 2003/0080270 A1 | 5/2003 | Gibson et al. | |
| 2003/0155475 A1 | 8/2003 | Hicks | |
| 2003/0173483 A1 * | 9/2003 | Yeh | 248/287.1 |
| 2004/0031891 A1 | 2/2004 | Augustin et al. | |
| 2004/0060775 A1 | 4/2004 | Gibson et al. | |
| 2005/0045785 A1 * | 3/2005 | Cohen | 248/214 |
| 2007/0075198 A1 * | 4/2007 | Foser | 248/226.11 |
| 2008/0031713 A1 | 2/2008 | Henderson | |
| 2009/0067966 A1 | 3/2009 | Hicks | |
| 2012/0079769 A1 | 4/2012 | Krause | |

* cited by examiner

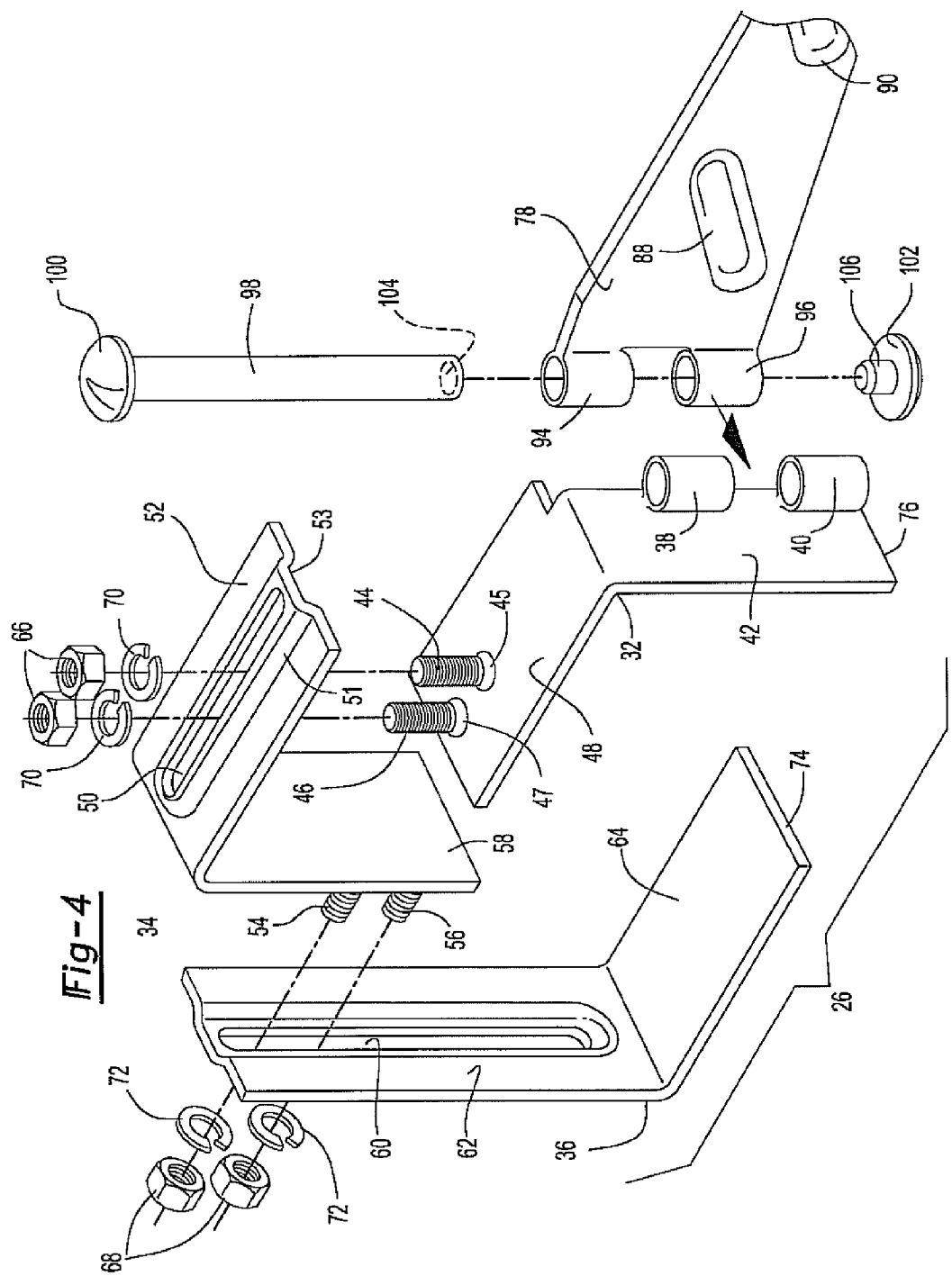

_US 9,168,783 B2_

PIVOT HANGER ASSEMBLY SECURED TO A TUBULAR SUPPORT LOCATION ASSOCIATED WITH A VERTICALLY ACTUATING VEHICLE LIFT

CROSS-REFERENCE TO RELATED APPLICATIONS

This application claims the benefit of U.S. Provisional Application 61/611,814 filed on Mar. 16, 2012, the contents of which are incorporated herein its entirety.

FIELD OF THE INVENTION

The present invention discloses a support device attached to a structural location of a vertically actuating vehicle lift. More specifically, the present invention discloses a pivotally supported hanger secured to a tubular location of a vehicle underbody supporting lift assembly proximate in location to a vehicle wheel and which facilitates transfer of a vehicle tire and rim to and from the wheel without requiring the individual to squat in order to place the tire and rim upon a floor or alternatively elevate the tire from the floor to replace it on to the wheel.

BACKGROUND OF THE INVENTION

The prior art is documented with examples of hoist mounted wheel hangers, and such as for hanging a wheel on a hoist arm. A first example of this is set forth in Henderson, U.S. Pat. No. 7,815,158 which teaches a double hinged and hoist mounted wheel hanger including a rigid clevis having top, bottom and base plates arranged in an integral "U" shape and such that a first hinge bolt passes through the top and bottom plates for supporting an arm connector. A second hinge bolt passes through the arm connector and in turn hingedly supports a further extending and pivotally support rod, upon an end of which is exhibited a retainer pin for supporting a wheel and preventing the same from slipping off the arm.

A series of related apparatuses for supporting automotive tires on a hanger hoist are depicted in each of US 2003/0080270, US 2002/0047077, US 2002/0003196 and 2004/0060775, all to Gibson et al. and each of which disclosing a hanger pin or spindle 3-10 inches in length with a coned or rounded distal end and extending from a hingedly mounted support arm in a direction slightly upward from a horizontal plane. Hicks US 2003/0155475 and US 2009/0067966 each teaches a hoist tire hanger with an angled bracket configuration for vertically attaching to a horizontal tubular hoist location and which depicts an upwardly angled tire hanging section.

SUMMARY OF THE INVENTION

The present invention discloses a pivot hanger assembly adapted to being mounted to a structural supporting location associated with a vehicle lift. A clamp subassembly includes a plurality of assembleable and inter-adjustable brackets adapted to being affixed around a rectangular tubular perimeter corresponding to the structural supporting location of the vehicle lift.

A selected one of the brackets exhibits at least a first hinge collar support extending along a vertically extending edge, with an elongated arm exhibiting at least a second hinge collar support along a proximal end which aligns with the first collar support in order to define a continuous channel. A hinge pin inserts through the continuous channel and in order to hingedly mount the arm to the clamp subassembly in a load bearing permitting fashion.

Additional features include first and second pluralities of hinge collar supports arranged in alternating spaced apart fashion. The clamp subassembly can also include first, second and third "L" shaped brackets, of which the first bracket is a hinge bracket supporting the first hinge collar supports.

In one non-limiting mounting arrangement, first and second selected "L" shaped brackets each have a pair of spaced apart and exteriorly threaded studs extending from selected edge surfaces thereof. Second and third selected of said "L" shaped brackets each exhibiting an elongated slot defined along further selected edge surfaces which overlap with the selected edge surfaces of the first and second brackets in order to assemble the studs through the slots in a continuous four sided extending fashion consistent with the tubular rectangular perimeter of the vehicle lift. Pluralities of nuts and lock washers affix and tighten over projecting threaded portions of the studs.

Additional features include the hinge pin exhibits a first integrally formed and annular enlarged head, a second annular enlarged head affixing to a distal projecting end of the pin following installation through the continuous channel. The elongated arm also exhibits a first proximal end located profile converging at a neck transition radii to an upwardly angled and distal end extending profile. A notch bottom radii is formed into an upper edge of the end extending profile proximate a distal end of the elongated arm which can also exhibit a stamped planar profile exhibiting a pattern of depth punch portions between the proximal and distal ends.

BRIEF DESCRIPTION OF THE DRAWINGS

Reference will now be made to the attached drawings, when read in combination with the following detailed description, wherein like reference numerals refer to like parts throughout the several views, and in which:

FIG. 4 is an exploded view of the clamp subassembly for affixing the hanger about a tubular perimeter location of the vehicle lift.

DETAILED DESCRIPTION OF THE PREFERRED EMBODIMENTS

As previously described, the present invention discloses a pivotally supported hanger secured to a tubular location of a vehicle underbody supporting lift assembly proximate in location to a vehicle wheel and which facilitates transfer of a vehicle tire and rim to and from the wheel without requiring the individual to squat in order to place the tire and rim upon a floor or alternatively elevate the tire from the floor to replace it on to the wheel.

The support hanger as disclosed below is incorporated into the swing arms associated with the auto lift, thereby elevating and lowering along with the vehicle lift swing arms. This allows the device to be raised and lowered with the auto to account for persons of differing height and is further hanged at the clamp portion in order to permit the hanger to be swung out of the way when not in use.

The hanger device is constructed of a strong and durable material, including but not limited to a steel or other metal exhibiting sufficient material characteristics sufficient for supporting the combined weight of a tire and rim, and along with factoring in the dynamic properties associated with the pivot bolt and spacer for interconnecting the pivot arm with the tubular section mounting clamp. The construction of the clamp and arm components of the hanger is further not limited to that depicted in the below description and accompanying illustrations, buy may further incorporate a tubular cross section (not limited to square tubing) with a hollow interior, such as in order to establish the necessary material characteristics along with reduction in weight and material content as opposed to a solid hanger construction.

Figure 1:
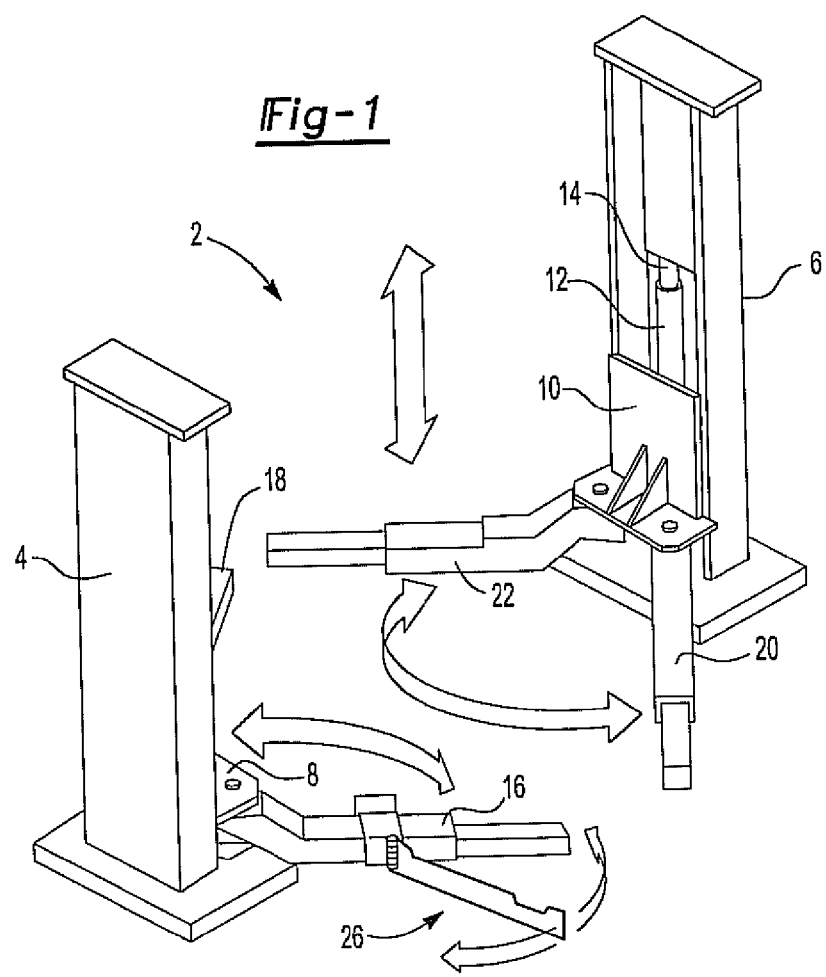
FIG. 1 is a perspective illustration of a conventional vehicle lift with plural and vehicle underbody supporting swing arms.

Referring to FIG. 1, a perspective illustration of a conventional vehicle lift is generally shown at 2 according to one non-limiting variant and which exhibits a pair of vertically extending and spaced apart superstructures 4 and 6. Each of opposing inner facing surfaces associated with the structures 2 and 4 exhibit a heavy duty lifting mechanism (such as including but not limited to inner vertical chain drives, electrical screw drives or other hydraulic powered lift cylinders) which communicates with a power source activated by controls mounted to or proximate the lift superstructure.

A pair of vertically traversable structural supports 8 and 10 are arranged in inner opposing fashion upon each of the superstructures 4 and 6 of the lift assembly. As previously indicated, any of vertical lift cylinders (see as represented in FIG. 1 by coaxial cylinder portions referenced at 12 and 14 for associated lift structure 6), as well as alternately any form of inner chain, screw drive or other suitable drive are integrated into each of the lift superstructures 4 and 6 and are powered in order to selectively elevate or lower the structural supports 8 and 10 in synchronized fashion.

Pairs of vehicle underbody supporting swing arms are shown at 16 & 18 pivotally mounted to the vertically traversable support 8 associated with the first lift superstructure 4, and further at 20 & 22 pivotally mounted to the vertically traversable support 10 associated with the second lift superstructure 6. As is known, the swing arms 16 & 18 and 20 & 22 each include either a solid or length adjustable and telescoping tubular body and can optionally terminate at an inner free ends in any suitable vehicle underbody frame supporting profile not limited to upwardly arrayed and load supporting pads or the like.

Figure 2:
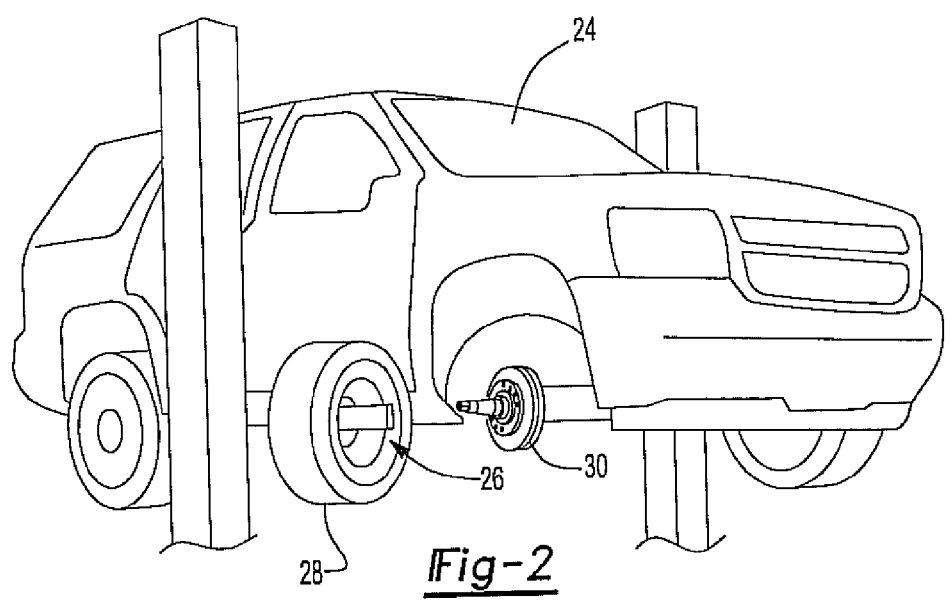
FIG. 2 is a rotated environmental perspective view of FIG. 1 depicting a vehicle supported upon the lift and the use of the hanger assembly for supporting the combined weight of a wheel and tire removed from the vehicle.

In this fashion, a vehicle 24 in FIG. 2 is supported upon the swing arms 16 & 18 and 20 & 22, upon the same being pre-rotated inwardly and underneath the vehicle underbody (prior to lifting) and pre-positioned at desired and structurally supporting contact locations. At this point, the controls associated with the lift 2 are activated and the supports 8 and 10 with pivotally secured swing arms 16 & 20 and 20 & 22 elevate along with the balanced and structurally supported vehicle to a desired elevated location, such as which permits an individual easy side and/or underneath access.

A wheel supporting pivot hanger assembly, generally at 26, which supports the combined weight of a tire 28 and supporting rim, such as upon removal from the wheel supporting structure established by the front axis (shown at 30) of the vehicle 24. As is best shown in FIG. 3, the hanger assembly 26 is adapted to secure to a tubular location, e.g. as shown at 16, associated with any or all of the swing arms (or any horizontal tubular support location arranged proximate to the lift location of the vehicle) in such a fashion as to facilitate ease of placement or return of a vehicle tire and rim 28 both to and from the vehicle wheel receiving axis 30, this again without the necessity of having to stoop or elevate to put down or pick up the tire.

Figure 3:
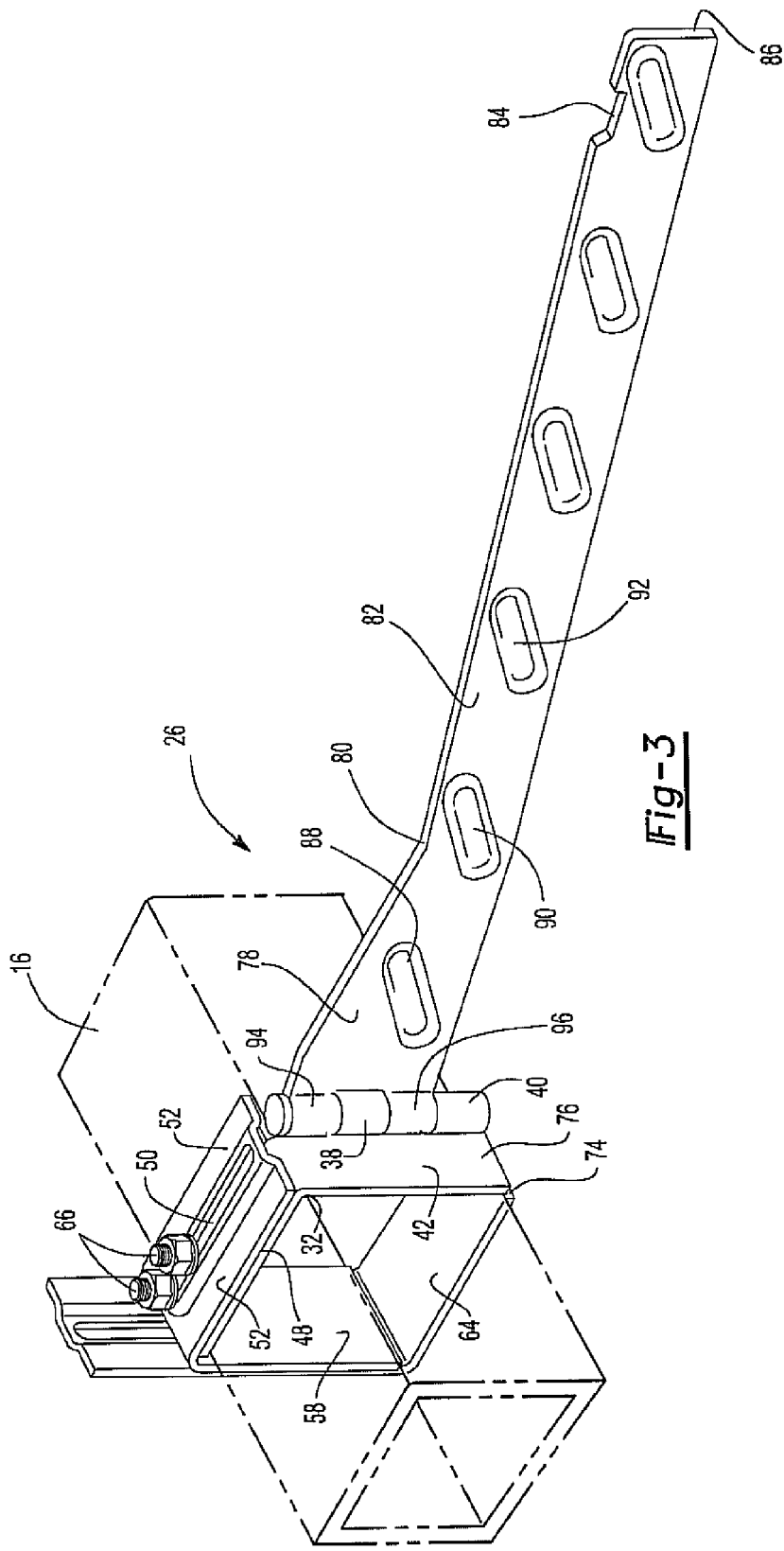
FIG. 3 is an assembled perspective of the pivot hanger assembly.

Referring to FIGS. 3 and 4, the pivot hanger assembly 26 is depicted in furthering detail and includes a clamp subassembly constructed of a plurality of three inter-assembleable and inter-adjustable brackets 32, 34 and 36 adapted to being affixed around a rectangular tubular perimeter (such as again referenced at 16 in FIG. 3) and corresponding to a given location of the vehicle lift. The brackets 32, 34 and 36 can be constructed of a suitable cold rolled steel, so as to impart the necessary properties of load bearing durability or resilience, however can include any other material which provides the necessary structural characteristics.

Each of the brackets 32, 34 and 36 exhibits a substantially "L" shape in profile with first and second angled sides. The first bracket 32 further exhibits a first plurality of spaced apart and hinged collar supports, depicted at 38 and 40, and extending along a vertically extending edge of an arrayed side 42. A pair of spaced apart and exteriorly threaded studs 44 and 46 projects from intermediate surface locations of a second angled side 48 of the first bracket 32.

The second angled bracket 34 likewise includes a lengthwise extending slot or recess, see elongated inner edge profile 50, defined along a first side 52 thereof, along with a further pair of spaced apart and exteriorly threaded studs 54 and 56 projecting from intermediate surface locations of a second angled side 58. The third angled bracket 36 includes a similarly configured lengthwise extending slot (elongated inner edge profile 60) defined along a first side 62 thereof, with a second angled and flat side 64.

The brackets 32, 34 and 36 are assembled in the manner best shown in FIG. 3 by aligning the pairs of projecting studs 44 and 46 of the first bracket 32 through linear seating locations of the slot 50 in the second bracket, concurrent with aligning the pairs of studs 54 and 56 of the second bracket 34 with the slot 60 in the third bracket 36. Individual pluralities of nuts 66 and 68 and spring biasing lock washers 70 and 72 affix and tighten over the projecting threaded portions of the pairs of studs 44/46 and 54/56 respectively.

The brackets 32, 34 and 36 can be successively assembled around the tubular perimeter location in such a fashion that the pairs of threaded studs 44/46 and 54/56 seat through their opposing slots 50 and 60 at a location in order to size the overlapping brackets to conform to each side dimension of the perimeter (e.g. again at 16). Upon the individual brackets 32, 34 and 36 being properly inter-aligned and tightened by the fasteners, the inner perimeter established by the assembled brackets closely matches the perimeter tubular profile (e.g. again at 16 in FIG. 3) of the horizontal lift at the desired mount location and such that a free lip edge 74 of the angled side 64 of the bracket 36 abuts an opposing lip edge 76 of the angled side 42 of the first bracket 32 (see again FIG. 4).

As further shown, the elongated slots, as best depicted by selected slot 50, are formed into an exterior protuberant surface (e.g. at 51 in FIG. 4) which results in a likewise recessed and depth accommodating underside 53 designed to seat opposing tapered base surfaces (shown respectively at 45 and 47 in FIG. 4) of the selected threaded studs 44 and 46. In this manner, the angled brackets 32, 34 and 36 inter-assemble in the desired fashion in order to establish a flush and anchored profile about the exterior perimeter of the tubular support location 16.

An elongated arm is depicted and exhibits a first proximal end located profile 78 converging at a neck transition radii location (at 80) to an upwardly angled and distal end extending profile 82. A notch bottom radii 84 is formed into an upper edge of the end extending profile proximate a distal end 86 of the elongated arm, which can also exhibit a stamped planar profile exhibiting a pattern of depth punch portions 88, 90, 92, et. seq. between the proximal and distal ends.

The elongated arm further exhibits a second plurality of hinge collar supports 94 and 96 projecting along a proximal end which aligns with the first collar supports 38 and 40 of the first bracket 32 and, upon assembly as shown in FIG. 3, in order to define a continuous channel. A hinge pin 98 inserts through the continuous channel created by the aligning and alternating collar supports 94, 38, 96 and 40 established between the elongated arm and first bracket and in order to hingedly mount the arm to the clamp subassembly in a load bearing permitting fashion.

Additional features include the hinge pin 98 exhibiting a first integrally formed and annular enlarged head 100. A second annular enlarged head 102 can be separately provided and affixed to a distal projecting end of the pin 98 (see end face located seating aperture 104 in phantom in FIG. 4 which receives an inner projecting stem 106 of the second annular head 102 in a press-fit or crimp-on fashion, this following installation through the continuous channel and to prevent accidental disengagement of the arm from the clamp subassembly.

Having described our invention, other and additional preferred embodiments will become apparent to those skilled in the art to which it pertains, and without deviating from the scope of the appended claims. This can include the plurality of three angled brackets making up the clamping subassembly being reconfigured as a differing plurality of inter-assembleable items for the purpose of sizing and securely clamping about the tubular perimeter defined lift location.

The hanger assembly is further capable of being reconfigured or redesigned for affixing to any other configuration of vehicle lift beyond that described and illustrated, as well as for mounting to any vertical pole, cart, jack, stand, wall or ceiling in any location which can operate in a manner similar to that described. It is further envisioned that the hanger device can be attached or mounted by any number of methods outside of that described, and which includes but is not limited to hinged, welded, bolted, bracketed or otherwise clamped. Yet additional features can include redesigning the tubular arm constructions to exhibit a range of telescopic motion, thereby accommodating larger tires and width dimensioned rims.

We claim:

1. A pivot hanger assembly adapted for mounting to a rectangular perimeter of a structural supporting location of a vehicle lift, said assembly comprising:
    a clamp subassembly having a first bracket, a second bracket and a third bracket which are each "L" shaped, and are inter-adjustably assembleable with one another for affixing around the rectangular perimeter of the structural supporting location of the vehicle lift;
    each bracket comprising a first side and a second side perpendicularly flanged relative to the first side such to respectively form the "L" shape of each bracket, and the brackets are assembled such that the second bracket is slidably mounted between the first bracket and the third bracket with the first side of each one of the brackets vertically oriented, and the second side of each one of the brackets horizontally oriented;
    said first bracket exhibiting spaced apart hinge collar supports vertically extending along the first side of the first bracket;
    a length extending slot respectively defined within the second side of said second bracket and the first side of said third bracket;
    a first pair of studs that are spaced apart from one another and exteriorly threaded are each anchored to and extend from an exterior surface the second side of the first bracket, and a second pair of studs that are spaced apart from one another and exteriorly threaded are each anchored base to and extend from an exterior surface the first side of the second bracket, said first pair of studs passing through said upon slot of the second bracket upon mounting the second side of the second bracket on the second side of the first bracket, said second pair of studs passing through said slot of the third bracket upon mounting the first side of the third bracket on the first side of the second bracket, a nut threadably engaging over a respective projecting end of each one of said first pair and second pair of studs to adjustably affix the first bracket, the second bracket and the third bracket around the rectangular perimeter of the structural support location such that the inner surface of the first bracket, the second bracket and the third bracket contact exterior surfaces defined by the rectangular perimeter of the structural supporting location, said brackets each being adjustable along a first axis and a second axis while mounted on the rectangular perimeter of the structural support location of the vehicle lift, wherein the second axis is perpendicular to the first axis;
    an elongated arm exhibiting additional spaced apart hinge collar supports along a proximal end which align with said spaced apart hinge collar supports of said first bracket such to define a continuous and cylindrical channel, said elongated arm further comprising a first proximal end located profile converging at a neck transition radii to an upwardly angled and distal end extending profile; and
    a hinge pin inserted into the continuous channel hingedly mounts said arm to said clamp subassembly such to permit the arm to bear load.

2. The pivot hanger assembly as described in claim 1, further comprising lock washers for affixing over the respective projecting end of each of said threaded studs of the first bracket and the second bracket prior to the engagement of said nuts.

3. The pivot hanger assembly as described in claim 1, said hinge pin further comprising a first integrally formed and annular enlarged head, a second annular enlarged head affixed to a distal projecting end of said hinge pin following installation of said hinge pin into the continuous channel.

4. The pivot hanger assembly as described in claim 1, further comprising a notch bottom radii formed into an upper edge of said end extending profile proximate a distal end of the elongated arm.

5. The pivot hanger assembly as described in claim 1, said elongated arm further comprising a stamped planar profile exhibiting a pattern of depth punch portions between said proximal end and a distal end of the elongated arm.

* * * * *